Oct. 29, 1963  W. L. WALTON  3,108,633
DEAERATING HEAT-ENGINE COOLING SYSTEM
Filed June 5, 1961
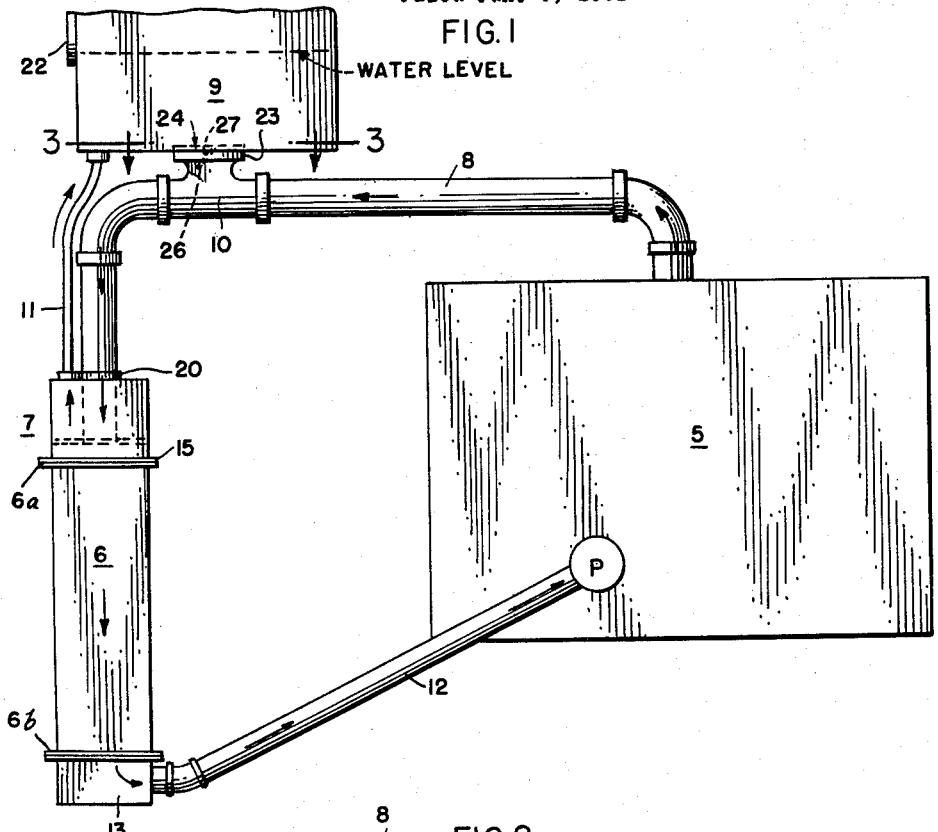
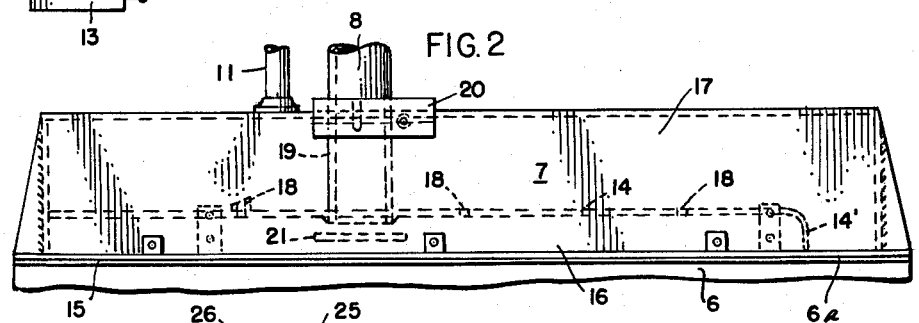
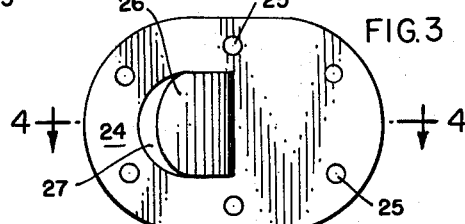
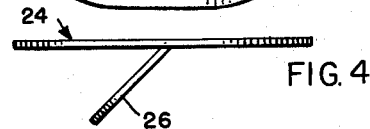
INVENTOR:
WILLIAM L. WALTON
BY
ATT'Y

United States Patent Office 3,108,633
Patented Oct. 29, 1963

3,108,633
DEAERATING HEAT-ENGINE COOLING SYSTEM
William L. Walton, Racine, Wis., assignor to Young Radiator Company, Racine, Wis., a corporation of Wisconsin
Filed June 5, 1961, Ser. No. 125,617
6 Claims. (Cl. 165—51)

This invention relates to a deaerating, fluid-cooling system for heat engines for powering public transportation motor-vehicles.

In public transportation motor-vehicles the fluid-cooled heat engine generally is located at the rear end of the chassis in a most limited space below the vehicle body. The engine is a diesel or gasoline type which generates a very considerable amount of heat. Space economy limits the space available for the engine cooling system. Because of the pressured flow of the cooling fluid around the engine cylinders and between and through the radiator coils, the fluid flow tends to become aerated, especially from the engine cylinders leaking cylinder gases through the gaskets. Such aeration often results in loss of cooling fluid, with consequent hazard of excessive temperatures and/or pressures tending to blow gaskets and/or crack engine cylinders. Where there is excessive aeration of the cooling fluid and the engine is shut down for a few minutes, there is likely to occur, in the cooling fluid, what is referred to as "after boil." This may suddenly shoot up the temperature of the cooling fluid 15 to 20 degrees Fahrenheit above the temperature that obtains during the normal operation of the vehicle. Such a sudden rise in the temperature tends to accelerate the above mentioned hazard of aeration.

Various attempts heretofore have been made to alleviate this excessive aeration of the cooling fluid. The most common expedient is to supplement the heat exchanger with a surge tank located at a level above the heat exchanger. However, even this added fluid facility, as heretofore connected into the cooling system, has not proven remedial of the excessive aeration tendencies in this type of equipment.

The main objects of this invention are to provide an improved structuring of the fluid cooling system for heat engines of the type generally used for powering public transportation vehicles; to provide an improved structuring of the top tank of a heat exchanger and its connection to a supplemental surge tank and the return-flow line of a cooling system for power units of this kind; and to provide an improved radiator-tank construction and surge-tank connection of this kind which insures practically complete deaerating of the cooling fluid under any and all normal operating conditions to which transportation vehicles may be subjected.

In the adaptations shown in the accompanying drawings:

FIG. 1 is a diagrammatic view showing the normal disposition of the engine and heat exchanger radiator with its improved top tank and the connection thereof to the supplemental surge tank;

FIG. 2 is a longitudinal side view of the top tank of the heat exchanger;

FIG. 3 is an enlarged, plan view of the primary connection to the supplemental surge tank to the return-flow line from the engine to the heat-exchanger radiator tank, the view being taken on the plane of the line 3—3 of FIG. 1; and FIG. 4 is a cross-sectional view of the primary surge-tank connection as taken on the plane of the line 4—4 of FIG. 3.

The essential concept of this invention, for a radiator-surge-tank heat-engine cooling system, involves a radiator top-tank divided into upper and lower chambers by a partition with the chambers having communicaiton with different groups of radiator tubes and having intercommunication through ports in the partition, the lower chamber having connected thereto the return-flow line from the engine and in which line is interposed a baffled coupling to the surge tank, the tank upper chamber having an over-flow connection to the surge tank.

This improved cooling system, for an engine 5 and its heat-exchanger radiator 6, comprises a radiator top-tank 7, connected to a return-flow line 8 from the engine 5, and a surge tank 9, communicating with the return-flow line 8 through a baffled coupling 10 and with the radiator tank 7 through a tank overflow pipe 11.

The engine 5 diagrammatically indicated is a diesel type such as used for the very large-size, overland, public transportation busses. Currently, these engines are very compact and mounted in the rear of the vehicle chassis in a most limited space under the vehicle body. As noted above, there is provided a most limited space for the equipment required for the engine cooling system.

The heat exchanger 6, except for the tank 7, is of conventional construction comprising the usual battery of tubes spanning and mounted on header plates 6a and 6b at their opposite ends, to which header plates are secured the top tank 7 and a lower tank 13 respectively. The latter is connected to a pump-activated in-flow line 12 leading to the engine 5. Generally, in equipment of this character, the pump creates a fluid pressure through this in-flow line of around 10 p.s.i. in the engine jacket.

The top tank 7 here is shown of rectangular cross-section with a bordering flange 15 along its open side by which the tank 7 is secured to the header plate 6a. An interior partition 14 extends horizontally transversely of the tank 7 and is bonded along its entire perimeter to the tank to divide it, when positioned on the header plate 6a, into lower and upper chambers 16 and 17.

One end of the partition is turned down as shown at 14'. Thus, when the tank 7 is in place on the radiator core unit, the upper chamber 17 communicates directly with a very limited number of tubes in the core unit and the lower chamber 16 communicates directly with all the remainder of the tubes in the core unit. In this respect this arrangement of the partition 14 is an embodiment of the disclosure of copending application Ser. No. 735,169, now Patent No. 3,004,626.

The chambers 16 and 17 communicate with each other through small-diameter apertures 18 in the partition 14. These apertures 18 are located at points along the length of the partition 14. Such apertures 18 permit any air, collecting in the lower chamber 16, along the under face of the partition 14, to escape into the upper chamber 17. Moreover, these apertures 18 permit a limited and unagitated flow of water from the lower chamber 16 into the upper chamber 17. If any such limited water flow contains air or gas bubbles they will tend to separate from the water and spread along the under face of the top wall of the tank 7 and find its way out through the conduit 11 to the surge tank 9.

The return-flow line 8, leading from the engine 5, is connected to the tank lower chamber 16 through a nipple 19 spanning the tank top chamber 17 and forming the outlet for the conduit 8 into the lower chamber 16. The nipple 19 is bonded at its lower end to the partition 14 with the extremity of the lower nipple end protruding slightly below the under face of the partition 14. At its upper end the nipple 19 is bonded to a plate 20 in turn bonded to the outer face of the tank 7. The end of the return-flow line 8 is connected to this plate 20, in registration with the nipple 19, in any conventional manner. Directly below the nipple 19, on the core header is a splash plate 21.

The surge tank 9 is positioned above the return-flow line 8 and communicates therewith through the baffled coupling 10. The tank 9 has a fill opening 22, here shown on one side of the tank. The position of this opening 22 more or less determines the water level in the tank and, presumably, indicates the quantity of water in the system.

The coupling 10 here is shown in the nature of a conventional T and is so interposed in the return-flow line 8 as to permit supporting the surge tank 8 on a flange 23 defining the transverse opening through which the return-flow-line 8 communicates with the surge tank 9. Such communication is regulated, in a measure, by a baffle plate 24. As most clearly shown in FIGS. 3 and 4, this plate 24 is exteriorly contoured to conform with the coupling flange 23 and has fastener holes 25 registering with similar holes in the coupling 10 and by means of which fasteners the surge tank is secured in operative position on the return-flow-line 8.

A section 26 of the baffle plate 24, conforming with the internal contour of the transverse part of the coupling 10, is cut away and bent downwardly at an angle of approximately 45 degrees (FIG. 4). As shown in FIG. 1, the baffle plate 24 is so positioned between the coupling flange 23 and the surge tank 9 that the angled section 26 defines an opening 27 (FIG. 1) which affords communication between the surge tank 9 and the return-flow line 8, forwardly of the angled section 26. Such an angled opening will cause the fluid flow through the line 8 to inject water from surge tank 9 into that portion of the line 8 leading to the radiator 6, as presently will be explained more fully.

The radiator tank over-flow pipe 11 is a small-size pipe connected at one end to the top wall of the tank 7 and to the bottom of the surge tank 9, outwardly of its position on the baffled coupling 10. This pipe 11 provides constant communication between the upper chamber 17 of the upper tank 7 and the surge tank 9. Obviously, if there is such a quantity of water or pressure in the cooling system, through the radiator and the engine and its in-flow line 13 and return-flow line 8, as to effect a sufficient pressure on the water in the upper chamber 17 water will overflow from the upper chamber 17 into the surge tank 9. On the other hand, if there should occur a deficiency of water, in the radiator, engine and flow lines, water could flow from the surge tank 9 through the pipe 11 back into the upper chamber 17 at the same time as water might be flowing from the surge tank 9 back into the lower chamber 16 through the opening 27.

When this system is in normal operation the in-flow pump pressures the water into the engine 5 to produce approximately 10 p.s.i. in the water jacket. Water is discharged from the engine 5 into the return-flow line 8 at approximately 6 p.s.i. The pressure of the water from the return-flow line 8 into the lower chamber 16 of the tank 7 is approximately 4.5 p.s.i. The pressure in the surge tank approximates 3 p.s.i.

The operation of a heat-engine cooling system, constructed as herein described, results in a practically complete deaerating of the engine cooling system for the following reasons:

The flow of water through the return conduit 8 past the baffle 26 has an ejector effect to draw surge-tank water through the opening 27. This insures an ample supply of water at all times in the radiator 6, the engine jacket and the connecting conduits 8 and 12.

All of the return water flow is directed into the lower chamber 16 of the upper tank 7 and pressured to flow down through all the radiator tubes except the small group at the one end of the radiator. Any air bubbles occuring in this lower chamber 16, by reason of water turbulence or gases seeping through the engine gaskets, can escape through the apertures 18 in the partition 14 into the upper chamber 17. This upper chamber 17 being free of water turbulence permits the air bubbles to rise to the top of the chamber 17 and find their way to the pipe 11 and into the surge tank 9.

There being no turbulence in this upper chamber 17, there is a quiet flow of water therefrom into the small group of tubes at the one end of the radiator 6 to rejoin the water flow through the conduit 12 back to the engine jacket.

Variations and modifications in the details of structure and arrangement of the parts may be resorted to within the spirit and coverage of the appended claims.

I claim:

1. A closed heat-engine deaerating liquid-cooling system comprising, a heat engine having a cooling jacket, a radiator having upper and lower tanks, header plates supporting the respective tanks and spanned by an interposed battery of tubes, affording liquid communication between the tanks, the lower tank being connected to the heat-engine cooling jacket, an interposed pump in the connection of the lower tank to the engine cooling jacket, a longitudinally-disposed apertured partition internally bonded to the upper tank to divide the interior thereof into upper and lower chambers having intercommunication between the chambers confined to the apertures in the partition, a return-flow conduit connecting the engine cooling jacket with the lower chamber of the upper tank, a coupling interposed in the return-flow conduit, a surge tank disposed above the return-flow conduit and communicatively connected with the coupling, a baffle positioned in the coupling to cause the fluid flow through the return-flow conduit to draw liquid from the surge tank, and a pipe connecting the upper chamber of the upper tank with the surge tank to permit the escape of fluid and air from the upper chamber of the upper tank to the surge tank.

2. A closed heat-engine deaerating liquid-cooling system comprising, a heat engine having a cooling jacket, a radiator having upper and lower tanks, header plates supporting the respective tanks and spanned by an interposed battery of tubes, affording liquid communication between the tanks, the lower tank being connected to the heat-engine cooling jacket, an interposed pump in the connection of the lower tank to the engine cooling jacket, a longitudinally-disposed apertured partition internally bonded to the upper tank to divide the interior thereof into upper and lower chambers having intercommunication between the chambers confined to the apertures in the partition, a return-flow conduit connecting the engine cooling jacket with the lower chamber of the upper tank, a T-coupling interposed in the return-flow conduit, a surge tank disposed above the return-flow conduit and secured to the transverse part of the T-coupling, a baffle located on the bottom of the surge tank and extending into the coupling at an angle in the direction of the return flow through the conduit whereby the return flow tends to draw water from the surge tank, and a pipe connecting the upper chamber of the upper tank with the bottom of the surge tank to permit the escape of fluid and air from the upper chamber of the upper tank to the surge tank.

3. A closed heat-engine deaerating liquid-cooling system comprising, a heat engine having a cooling jacket, a radiator having upper and lower tanks, header plates supporting the respective tanks and spanned by an interposed battery of tubes, affording liquid communication between the tanks, the lower tank being connected to the heat-engine cooling jacket, an interposed pump in the connection of the lower tank to the engine cooling jacket, a longitudinally-disposed partition apertured internally bonded to the upper tank to divide the interior thereof into upper and lower chambers and terminating adjacently inward of one end of the upper tank and bonded to the respective header plate transversely inward of a predetermined number of tubes whereby the upper chamber of the upper tank has communication confined to a limited number of tubes and the lower chamber has communication confined to the remainder of the tubes, the chambers having intercommunication between the chambers confined to the apertures in the partition, a return-flow conduit connecting the engine cooling jacket with the lower chamber of the upper tank, a coupling interposed in the return-flow conduit, a surge tank disposed above the return-flow conduit and communicatively connected with the coupling, a baffle positioned in the coupling to cause the fluid flow through the return-flow conduit to draw liquid from the surge tank, and a pipe connecting the upper chamber of the upper tank with the surge tank to permit the escape of fluid and air from the upper chamber of the upper tank to the surge tank.

4. A closed heat-engine deaerating liquid-cooling system comprising, a heat engine having a cooling jacket, a radiator having upper and lower tanks, header plates supporting the respective tanks and spanned by an interposed battery of tubes, affording liquid communication between the tanks, the lower tank being connected to the heat-engine cooling jacket, an interposed pump in the connection of the lower tank to the engine cooling jacket, a longitudinally-disposed apertured partition internally bonded to the upper tank to divide the interior thereof into upper and lower chambers and terminating adjacently inward of one end of the upper tank and bonded to the respective header plate transversely inward of a predetermined number of tubes whereby the upper chamber of the upper tank has communication confined to a limited number of tubes and the lower chamber has communication confined to the remainder of the tubes, the chambers having intercommunication between the chambers confined to the apertures in the partition, a return-flow conduit connecting the engine cooling jacket with the lower chamber of the upper tank, a T-coupling interposed in the return-flow conduit, a surge tank disposed above the return-flow conduit and secured to the transverse part of the T-coupling, a baffle located on the bottom of the surge tank and extending into the coupling at an angle in the direction of the return flow through the conduit whereby the return flow tends to draw water from the surge tank, and a pipe connecting the upper chamber of the upper tank with the bottom of the surge tank to permit the escape of fluid and air from the upper chamber of the upper tank to the surge tank.

5. A closed heat-engine deaerating liquid-cooling system comprising, a heat engine having a cooling jacket, a radiator having upper and lower tanks, header plates supporting the respective tanks and spanned by an interposed battery of tubes, affording liquid communication between the tanks, the lower tank being connected to the heat-engine cooling jacket, an interposed pump in the connection of the lower tank to the engine cooling jacket, a longitudinally-disposed apertured partition internally bonded to the upper tank to divide the interior thereof into upper and lower chambers having intercommunication between the chambers confined to the apertures in the partition, a return-flow conduit connected at one end to the heat-engine cooling jacket and at the other end to the upper tank intermediate its ends with the outlet of the return-flow conduit located below the partition, a T-coupling interposed in the return-flow conduit, a surge tank disposed above the return-flow conduit and secured to the transverse part of the T-coupling, a baffle located on the bottom of the surge tank and extending into the coupling at an angle in the direction of the return-flow through the conduit whereby the return flow tends to draw water from the surge tank, and a pipe connecting the upper chamber of the upper tank with the bottom of the surge tank to permit the escape of fluid and air from the upper chamber of the upper tank to the surge tank.

6. A closed heat-engine deaerating liquid-cooling system comprising, a heat engine having a cooling jacket, a radiator having upper and lower tanks, header plates supporting the respective tanks and spanned by an interposed battery of tubes, affording liquid communication between the tanks, the lower tank being connected to the heat-engine cooling jacket, an interposed pump in the connection of the lower tank to the engine cooling jacket, a longitudinally-disposed apertured partition internally bonded to the upper tank to divide the interior thereof into upper and lower chambers having intercommunication between the chambers confined to the apertures in the partition, a return-flow conduit connected at one end to the heat-engine cooling jacket and at the other end connected to the top of the upper tank intermediate its ends with the outlet of the return-flow conduit located below the partition, a splash plate located in the lower chamber of the upper tank below the outlet of the return flow conduit and intermediate the partition and the respective header plate, a T-coupling interposed in the return-flow conduit, a surge tank disposed above the return-flow conduit and secured to the transverse part of the T-coupling, a baffle located on the bottom of the surge tank and extending into the coupling at an angle in the direction of the return-flow through the conduit whereby the return flow tends to draw water from the surge tank, and a pipe connecting the upper chamber of the upper tank with the bottom of the surge tank to permit the escape of fluid and air from the upper chamber of the upper tank to the surge tank.

References Cited in the file of this patent

UNITED STATES PATENTS

| | | |
|---|---|---|
| 1,367,636 | Sturtevant | Feb. 8, 1921 |
| 1,437,187 | Macdonald | Nov. 28, 1922 |
| 3,004,626 | Brinen | Oct. 17, 1961 |
| 3,006,609 | Anthony | Oct. 31, 1961 |